(12) United States Patent
Inoue

(10) Patent No.: US 10,509,212 B2
(45) Date of Patent: Dec. 17, 2019

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventor: Kazuki Inoue, Saitama (JP)

(73) Assignee: FUJIFILM Corporation, Tokyo (JP)

(*) Notice: Subject to any disclaimer, the term of this patent is extended or adjusted under 35 U.S.C. 154(b) by 63 days.

(21) Appl. No.: 16/004,142

(22) Filed: Jun. 8, 2018

(65) Prior Publication Data

US 2018/0364460 A1   Dec. 20, 2018

(30) Foreign Application Priority Data

Jun. 19, 2017  (JP) ................... 2017-119849

(51) Int. Cl.
| | |
|---|---|
| G02B 13/16 | (2006.01) |
| G02B 15/15 | (2006.01) |
| H04N 5/225 | (2006.01) |
| H04N 9/31 | (2006.01) |
| G02B 27/18 | (2006.01) |
| G02B 13/18 | (2006.01) |

(52) U.S. Cl.
CPC ............ *G02B 15/15* (2013.01); *G02B 13/18* (2013.01); *G02B 27/18* (2013.01); *H04N 5/2254* (2013.01); *H04N 9/3197* (2013.01)

(58) Field of Classification Search
CPC ......... G02B 13/16; G02B 27/18; G02B 15/00
USPC ................... 359/362, 434, 677, 679
See application file for complete search history.

(56) References Cited

U.S. PATENT DOCUMENTS

| | | |
|---|---|---|
| 2015/0234157 A1 | 8/2015 | Ichimura |
| 2016/0246037 A1 | 8/2016 | Amano |

FOREIGN PATENT DOCUMENTS

| | | | |
|---|---|---|---|
| JP | 2003-232993 A | 8/2003 | |
| JP | 2015-152764 A | 8/2015 | |
| JP | 2016-143032 A | 8/2016 | |
| JP | 2016-156986 A | 9/2016 | |

*Primary Examiner* — Darryl J Collins
(74) *Attorney, Agent, or Firm* — Studebaker & Brackett PC

(57) ABSTRACT

The imaging optical system consists of, in order from the magnification side, a first optical system and a second optical system. The second optical system forms an intermediate image at a position conjugate to the reduction side imaging surface, and the first optical system re-forms the intermediate image on the magnification side imaging surface. The second optical system consists of, in order from the magnification side, a first positive lens, a cemented lens having a positive refractive power as a whole, and a second positive lens. The cemented lens includes one negative lens and one positive lens.

20 Claims, 10 Drawing Sheets

EXAMPLE 1

EXAMPLE 1

EXAMPLE 2

IMAGING OPTICAL SYSTEM, PROJECTION DISPLAY DEVICE, AND IMAGING APPARATUS

CROSS-REFERENCE TO RELATED APPLICATIONS

The present application claims priority under 35 U.S.C. § 119 to Japanese Patent Application No. 2017-119849, filed on Jun. 19, 2017. The above application is hereby expressly incorporated by reference, in its entirety, into the present application.

BACKGROUND OF THE INVENTION

1. Field of the Invention

The present invention relates to an imaging optical system suitable for a projection display device and a digital camera, a projection display device comprising the imaging optical system, and an imaging apparatus comprising the imaging optical system.

2. Description of the Related Art

In the past, projection display devices, each of which projects an image displayed on a light valve such as a liquid crystal display element or a Digital Micromirror Device (DMD: registered trademark) onto a screen or the like in an enlarged manner, have come into widespread use. In recent years, in accordance with the improvement in the performance of light valves, there is a demand to perform favorable aberration correction appropriate for the resolutions of light valves on projection lenses used in combination with light valves. In addition, since scenes of projecting onto a large screen at a large hall or exhibition using a projection display device and scenes requiring a larger screen size at a short projection distance are increasing, there is a demand for a wider-angle imaging optical system.

In order to cope with the above demands, as an imaging optical system applicable to a projection display device, JP2015-152764A, JP2016-156986A, and JP2016-143032A each propose an optical system in which a reduction side optical system consisting of a plurality of lenses forms an intermediate image and a magnification side optical system consisting of a plurality of lenses re-forms the image. In addition, JP2003-232993A describes an optical system which is a refractive optical system that forms an intermediate image and which can be used in the near-infrared wavelength range.

SUMMARY OF THE INVENTION

In recent years, in order to realize a high brightness projection display device, an optical system having a small F number is required as a projection lens. Further, from the viewpoint of installability and portability of the apparatus, a lightweight optical system is required.

However, in consideration of the recent demands, it can not be said that the optical systems described in JP2015-152764A, JP2016-156986A, JP2016-143032A, and JP2003-232993A each have a sufficiently small F number. Therefore, there is a demand for an imaging optical system having a smaller F number while maintaining high optical performance. Further, in the optical systems described in JP2015-152764A, JP2016-156986A, and JP2016-143032A, the number of lens components of the optical system on the reduction side are greater than the intermediate image and the weight is large, such that a lighter optical system is required.

The present invention has an object to provide an imaging optical system which has a small F number and is reduced in weight so as to have favorable performance, a projection display device comprising the imaging optical system, and an imaging apparatus comprising the imaging optical system.

In order to solve the above-mentioned problems, an imaging optical system of the present invention consists of, in order from a magnification side to a reduction side: a first optical system; and a second optical system. The second optical system forms an intermediate image at a position conjugate to a reduction side imaging surface. The first optical system re-forms the intermediate image on a magnification side imaging surface. The second optical system consists of, in order from the magnification side, a first positive lens, a cemented lens having a positive refractive power as a whole, and a second positive lens, in which the cemented lens includes at least one negative lens and at least one positive lens.

In the imaging optical system of the present invention, assuming that a lateral magnification of the second optical system is MAG2, a distance on an optical axis between the first positive lens and the cemented lens is Dab, a focal length of the first positive lens is fp1, a distance on an optical axis between the cemented lens and the second positive lens is Dcd, and a focal length of the second positive lens is fp2, it is preferable that one or any combination of Conditional Expressions (1), (1-1), (2), (2-1), and (3) to (6) is satisfied.

$$-0.4 < MAG2 < -0.1 \tag{1}$$

$$-0.35 < MAG2 < -0.15 \tag{1-1}$$

$$0.7 < Dab/fp1 < 1.1 \tag{2}$$

$$0.75 < Dab/fp1 < 1.05 \tag{2-1}$$

$$0.65 < Dcd/fp2 < 1.3 \tag{3}$$

$$0.2 < Dcd/Dab < 0.6 \tag{4}$$

$$0.15 < fp2/fp1 < 0.5 \tag{5}$$

$$-1.2 < MAG2/(fp2/fp1) < -0.7 \tag{6}$$

The imaging optical system of the present invention further comprises: a negative lens group that consists of a plurality of negative lenses and is disposed to be closest to the magnification side; and a positive lens that is disposed consecutively to the negative lens group on the reduction side of the negative lens group. Assuming that a Petzval sum of the negative lens group is Pzn, a focal length of the negative lens group is fn, and a maximum image height on the reduction side is Ymax, it is preferable that Conditional Expressions (7) and (8) are satisfied.

$$0.2 < Pzn \times fn < 0.8 \tag{7}$$

$$-0.8 < Pzn \times Ymax < -0.3 \tag{8}$$

In the imaging optical system of the present invention, assuming that a Petzval sum of the first optical system is Pz1, a focal length of the first optical system is f1, and a maximum image height on the reduction side is Ymax, it is preferable that Conditional Expressions (9) and (10) are satisfied.

$$-0.6<Pz1 \times f1<-0.1 \qquad (9)$$

$$-0.6<Pz1 \times Y\text{max}<-0.1 \qquad (10)$$

In the imaging optical system of the present invention, assuming that a Petzval sum of the second optical system is Pz2, a focal length of the second optical system is f2, and a maximum image height on the reduction side is Ymax, it is preferable that Conditional Expressions (11) and (12) are satisfied.

$$2.5<Pz2 \times f2<6 \qquad (11)$$

$$0.1<Pz2 \times Y\text{max}<0.6 \qquad (12)$$

In the imaging optical system of the present invention, assuming that a Petzval sum of the first optical system is Pz1 and a Petzval sum of the second optical system is Pz2, it is preferable that Conditional Expression (13) is satisfied.

$$-1.2<Pz2/Pz1<-0.7 \qquad (13)$$

In the imaging optical system of the present invention, it is preferable that the cemented lens of the second optical system consists of one negative lens and one positive lens. In addition, assuming that an Abbe number of the negative lens within the cemented lens at a d line is vn and an Abbe number of the positive lens within the cemented lens at the d line is vp, it is preferable that Conditional Expression (14) is satisfied.

$$-52<vn-vp<-26 \qquad (14)$$

In the imaging optical system of the present invention, assuming that a focal length of the imaging optical system is f and a focal length of the second optical system is f2, it is preferable that Conditional Expression (15) is satisfied.

$$0.01<|f|/f2<0.1 \qquad (15)$$

In the imaging optical system of the present invention, the number of lenses composing the first optical system is preferably equal to or less than 10, and may be configured to be 10.

In the imaging optical system of the present invention, assuming that a focal length of the imaging optical system is f and a focal length of the first optical system is f1, it is preferable that Conditional Expression (16) is satisfied.

$$0.1<|f|/f1<0.5 \qquad (16)$$

A projection display device of the present invention comprises: a light source; a light valve into which light emitted from the light source is incident; and the imaging optical system of the present invention that serves as an imaging optical system projecting an optical image formed by modulated light which is modulated by the light valve, onto a screen.

An imaging apparatus of the present invention comprises the imaging optical system of the present invention.

In the present description, it should be noted that the terms "consisting of ~" mean that the imaging lens may include not only the above-mentioned elements but also lenses substantially having no powers, optical elements, which are not lenses, such as a stop, a filter, and a cover glass, and mechanism parts such as a lens flange, a lens barrel, an imaging element, and a camera shaking correction mechanism.

The sign of the refractive power in the present specification is to be considered in terms of the paraxial region unless otherwise noted. Further, the values used in the above conditional expressions are values based on the d line (a wavelength of 587.6 nm (nanometers)). Further, in the present specification, the "lens component" is a lens where the air contact surfaces on the optical axis are only two surfaces including the magnification side surface and the reduction side surface. In addition, one lens component is one single lens, or a set of cemented lenses.

It should be noted that in a case where the total number of lens surfaces of a certain lens group is k and i is a natural number of 1 or more, it is assumed that the refractive index of the magnification side medium composing the i-th lens surface from the magnification side of the lens group at the d line is Nfi, the refractive index of the reduction side medium composing the i-th lens surface from the magnification side of the lens group at the d line is Nri, and the radius of curvature of the i-th lens surface from the magnification side of the lens group is Ri. Under the assumption, the Petzval sum Pz of a certain lens group is defined by the following expression. It is the same for the Petzval sum of the first optical system and the Petzval sum of the second optical system.

$$Pz = \sum_{i=1}^{k} \frac{1}{Ri} \times \left( \frac{1}{Nfi} - \frac{1}{Nri} \right) \qquad \text{Numerical Expression 1}$$

According to the present invention, it is possible to provide an imaging optical system which has a small F number and is reduced in weight so as to have favorable performance, a projection display device comprising the imaging optical system, and an imaging apparatus.

DESCRIPTION OF THE PREFERRED EMBODIMENTS

Figure 1:
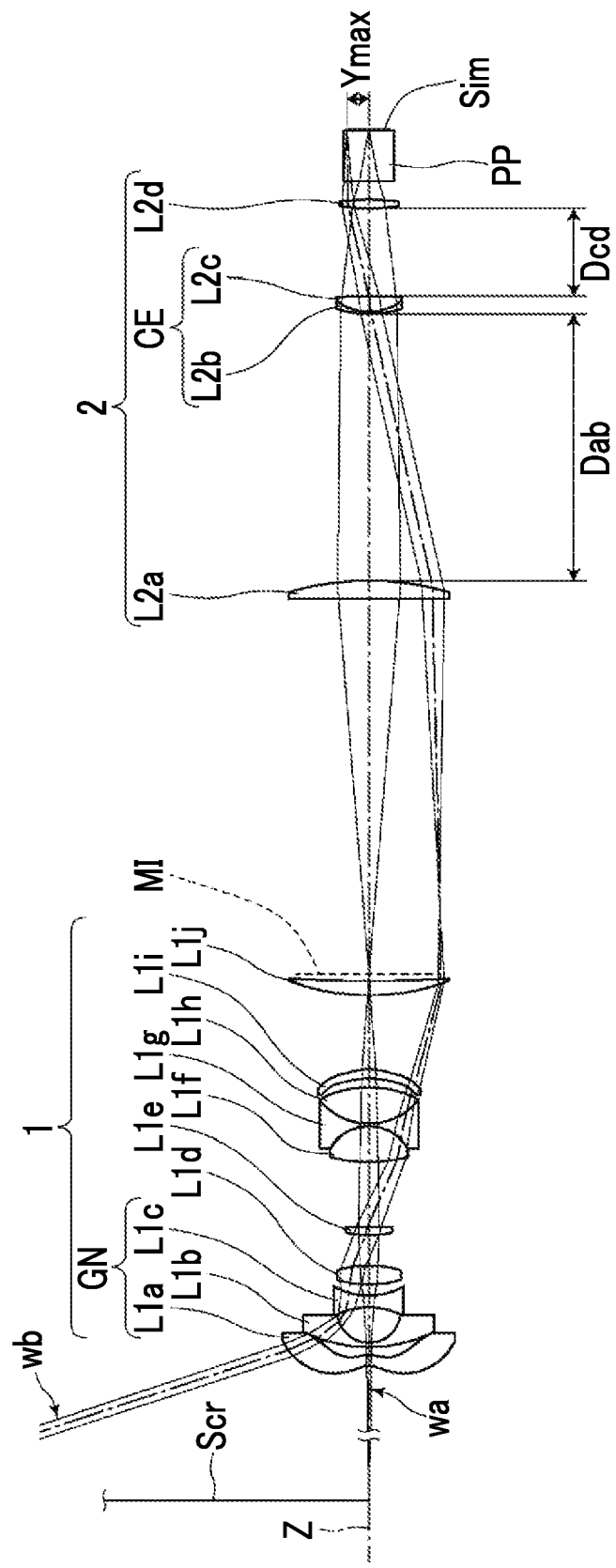
FIG. 1 is a cross-sectional view illustrating a configuration and an optical path of an imaging optical system of Example 1 of the present invention.

Hereinafter, embodiments of the present invention will be described with reference to drawings. FIG. 1 is a cross-sectional view illustrating a configuration of an imaging optical system according to an embodiment of the present invention. The exemplary configuration shown in FIG. 1 corresponds to Example 1 to be described later. In FIG. 1, the left side is the magnification side, and the right side is the reduction side, and on-axis rays wa and rays with the maximum angle of view wb are also shown.

The imaging optical system is an optical system that forms an intermediate image at a position conjugate to a reduction side imaging surface and forms the intermediate image again on a magnification side imaging surface. This imaging optical system is an optical system suitable as a projection optical system used for a projection display device and an image capturing optical system used for a digital camera or the like.

In FIG. 1, assuming that the zoom lens is mounted on the projection display device, a screen Scr, an optical member PP such as a filter and a prism used in a color synthesizing section or an illumination light separating section, and an image display surface Sim of a light valve positioned on the reduction side of the optical member PP are also shown. In the projection display device, rays, which are made to have image information through the image display surface Sim, are incident into the imaging optical system through the optical member PP, and are transmitted onto a screen Scr through the imaging optical system. That is, in the example of FIG. 1, the image display surface Sim corresponds to the reduction side imaging surface, and the screen Scr corresponds to the magnification side imaging surface.

The imaging optical system consists of, in order from the magnification side to the reduction side, a first optical system 1, and a second optical system 2. The second optical system 2 forms the intermediate image MI at a position conjugate to the reduction side imaging surface, and the first optical system 1 forms the intermediate image MI again on the magnification side imaging surface. In FIG. 1, the intermediate image MI is conceptually shown, and its position in the direction of the optical axis is basically shown as the position in the vicinity of the optical axis.

In the example shown in FIG. 1, the first optical system 1 consists of ten lenses L1a to L1j in order from the magnification side. The lens L1j, which is disposed in the vicinity of the intermediate image MI, has the function of a so-called field lens. The second optical system 2 is disposed to be closer to the reduction side than a field lens. Thus, in the example shown in FIG. 1, the second optical system 2 consists of four lenses L2a to L2d in order from the magnification side. Further, the second optical system 2 is disposed to be closer to the reduction side than the intermediate image MI. The term described herein "the second optical system 2 is disposed to be closer to the reduction side than the intermediate image MI" means that the second optical system 2 is disposed to be closer to the reduction side than both the point on the axis of the intermediate image MI and the point outside the outermost axis of the intermediate image MI.

Wide angle is desired for the projection lens mounted on the projection display device, but in an optical system which does not form a usual intermediate image, in a case where wide angle is intended to be achieved by shortening the focal length, inevitably, the lens diameter on the magnification side increases. In view of this, in a case of an optical system in which the intermediate image MI is formed as in the present embodiment and the intermediate image MI is re-formed on the screen Scr, it becomes easy to achieve wide angle by shortening the focal length while reducing the lens diameter on the magnification side.

The second optical system 2 consists of, in order from the magnification side, a first positive lens, a cemented lens CE having a positive refractive power as a whole, and a second positive lens. Further, the cemented lens CE includes at least one negative lens and at least one positive lens.

By using the above-mentioned configuration of the second optical system 2, there are advantages in reducing the size and the weight of the imaging optical system. In a case where chromatic aberration is intended to be corrected, high-order aberrations tend to occur. However, since the cemented lens of the above-mentioned configuration is included in the system, it becomes easy to balance chromatic aberration and spherical aberration, and in particular, it becomes easy to balance longitudinal chromatic aberration and high-order spherical aberration. It becomes easy to realize an optical system with a small F number. The term "high-order" described herein means 5th or more order.

By using the above-mentioned configuration of the second optical system 2, the second optical system 2 can be configured to consist of three lens components having a positive refractive power, and the positive refractive power required for the second optical system 2 can be divided among the three lens components. Thereby, the refractive power of each lens component of the second optical system 2 can be prevented from becoming excessively strong, and aberration can be reduced.

The cemented lens CE of the second optical system 2 may be configured to consist of one negative lens and one positive lens. In such a case, there is an advantage in satisfactorily correcting chromatic aberration while reducing the weight.

In the example shown in FIG. 1, a lens L2a corresponds to the first positive lens, and a lens L2d corresponds to the second positive lens. The lenses L2a and L2d are single lenses which are not cemented. In the example of FIG. 1, the cemented lens CE is formed by cementing a negative lens L2b and a positive lens L2c in order from the magnification side. However, as shown in Examples to be described later, it is also possible to construct a cemented lens CE by cementing a positive lens and a negative lens in order from the magnification side.

As in the example shown in FIG. 1, it is preferable that the first optical system 1 has a negative lens group GN that consists of a plurality of negative lenses and is disposed to be closest to the magnification side; and a positive lens that is disposed consecutively to the negative lens group GN on the reduction side of the negative lens group GN. In such a case, field curvature can be easily suppressed by the negative lens group GN, and there is an advantage in achieving the wide angle. It becomes easy to suppress distortion by the positive lens disposed consecutively to the negative lens group GN on the reduction side of the negative lens group GN. In the example of FIG. 1, the negative lens group GN consists of three negative lenses L1a, L1b, and L1c.

In the example shown in FIG. 1, the number of lenses composing the first optical system 1 is 10. In a case where the number of lenses composing the first optical system 1 is 10 or 10 or less, there is an advantage in reducing the weight.

Hereinafter, preferred configurations relating to conditional expressions will be described. Assuming that a lateral magnification of the second optical system 2 is MAG2, it is preferable that Conditional Expression (1) is satisfied. By not allowing the result of Conditional Expression (1) to be equal to or less than the lower limit, it is possible to obtain a wide angle of view while miniaturizing the image display element of the light valve in the projection display device. By not allowing the result of Conditional Expression (1) to be equal to or greater than the upper limit, it is possible to ensure the number of pixels of the image display element of the light valve in the projection display device and the number of pixels of the imaging element in the imaging apparatus. In addition, in a case of a configuration in which Conditional Expression (1-1) is satisfied, it is possible to obtain more favorable characteristics.

$$-0.4 < MAG2 < -0.1 \tag{1}$$

$$-0.35 < MAG2 < -0.15 \tag{1-1}$$

MAG 2 is a lateral magnification in a case where light travels from the magnification side to the reduction side, and is a reduction magnification. Further, the MAG 2 is a magnification in a state in which the MAG 2 is focused on the magnification side imaging surface which is separated by 0.47 m from the lens surface closest to the magnification side on the optical axis. It is the same for MAG 2 represented in the following conditional expression.

In the second optical system 2, assuming that a distance on an optical axis between the first positive lens and the cemented lens CE is Dab and a focal length of the first positive lens is fp1, it is preferable that Conditional Expression (2) is satisfied. By satisfying Conditional Expression (2), it becomes easy to appropriately set the distance between the first positive lens and the cemented lens CE so as to position the cemented lens CE in the vicinity of the pupil position. As a result, it becomes easy to satisfactorily correct longitudinal chromatic aberration. In addition, in a case of a configuration in which Conditional Expression (2-1) is satisfied, it is possible to obtain more favorable characteristics.

$$0.7 < Dab/fp1 < 1.1 \tag{2}$$

$$0.75 < Dab/fp1 < 1.05 \tag{2-1}$$

In the second optical system 2, assuming that a distance on an optical axis between the cemented lens CE and the second positive lens is Dcd and a focal length of the second positive lens is fp2, it is preferable that Conditional Expression (3) is satisfied. By satisfying Conditional Expression (3), it becomes easy to appropriately set the distance between the cemented lens CE and the second positive lens so as to position the cemented lens CE in the vicinity of the pupil position. As a result, it becomes easy to satisfactorily correct longitudinal chromatic aberration. In addition, in a case of a configuration in which Conditional Expression (3-1) is satisfied, it is possible to obtain more favorable characteristics.

$$0.65 < Dcd/fp2 < 1.3 \tag{3}$$

$$0.7 < Dcd/fp2 < 1.25 \tag{3-1}$$

In the second optical system 2, assuming that a distance on an optical axis between the first positive lens and the cemented lens CE is Dab and a distance on the optical axis between the cemented lens CE and the second positive lens is Dcd, it is preferable that Conditional Expression (4) is satisfied. By satisfying Conditional Expression (4), it becomes easy to appropriately set the position of the cemented lens CE in the second optical system 2 so as to position the cemented lens CE in the vicinity of the pupil position. As a result, it becomes easy to satisfactorily correct longitudinal chromatic aberration. In addition, in a case of a configuration in which Conditional Expression (4-1) is satisfied, it is possible to obtain more favorable characteristics.

$$0.2 < Dcd/Dab < 0.6 \tag{4}$$

$$0.25 < Dcd/Dab < 0.55 \tag{4-1}$$

In the second optical system 2, assuming that a focal length of the first positive lens is fp1 and a focal length of the second positive lens is fp2, it is preferable that Conditional Expression (5) is satisfied. By satisfying Conditional Expression (5), it becomes easy to appropriately set the balance between the refractive power of the first positive lens and the refractive power of the second positive lens so as to position the cemented lens CE in the vicinity of the pupil position. As a result, it becomes easy to satisfactorily correct longitudinal chromatic aberration. In addition, in a case of a configuration in which Conditional Expression (5-1) is satisfied, it is possible to obtain more favorable characteristics.

$$0.15 < fp2/fp1 < 0.5 \tag{5}$$

$$0.2 < fp2/fp1 < 0.45 \tag{5-1}$$

In the second optical system 2, assuming that a lateral magnification of the second optical system 2 is MAG2, a focal length of the first positive lens is fp1, and a focal length of the second positive lens is fp2, it is preferable that Conditional Expression (6) is satisfied. By satisfying Conditional Expression (6), it becomes easy to appropriately set the balance between the refractive power of the first positive lens and the refractive power of the second positive lens while considering the imaging magnification of the second optical system 2 so as to position the cemented lens CE in the vicinity of the pupil position. As a result, it becomes easy to satisfactorily correct longitudinal chromatic aberration. In addition, in a case of a configuration in which Conditional Expression (6-1) is satisfied, it is possible to obtain more favorable characteristics.

$$-1.2 < MAG2/(fp2/fp1) < -0.7 \tag{6}$$

$$-1.1 < MAG2/(fp2/fp1) < -0.8 \tag{6-1}$$

In a case where the first optical system 1 has the negative lens group GN and a positive lens that is disposed consecutively to the negative lens group GN on the reduction side of the negative lens group GN, assuming that a Petzval sum of the negative lens group GN is Pzn and a focal length of the negative lens group GN is fn, it is preferable that Conditional Expression (7) is satisfied. By not allowing the result of Conditional Expression (7) to be equal to or less than the lower limit, the field curvature of the first optical system 1 is made to have a tendency to be over, and is canceled by the image plane fluctuation through the second optical system 2. As a result, it is possible to satisfactorily correct field curvature. By not allowing the result of Conditional Expression (7) to be equal to or greater than the upper limit, overcorrection is prevented in a case where the image plane fluctuation is canceled through the first optical system 1 and the second optical system 2. As a result, it is possible to satisfactorily correct field curvature. In addition, in a case of a configuration in which Conditional Expression (7-1) is satisfied instead of Conditional Expression (7), it is possible to obtain more favorable characteristics.

$$0.2 < Pzn \times fn < 0.8 \tag{7}$$

$$0.3 < Pzn \times fn < 0.7 \tag{7-1}$$

In a case where the first optical system 1 has the negative lens group GN and a positive lens that is disposed consecutively to the negative lens group GN on the reduction side of the negative lens group GN, assuming that a Petzval sum of the negative lens group GN is Pzn and a maximum image height on the reduction side is Ymax, it is preferable that Conditional Expression (8) is satisfied. By not allowing the result of Conditional Expression (8) to be equal to or less than the lower limit, overcorrection is prevented in a case where the image plane fluctuation is canceled through the first optical system 1 and the second optical system 2. As a result, it is possible to satisfactorily correct field curvature. By not allowing the result of Conditional Expression (8) to be equal to or greater than the upper limit, the field curvature of the first optical system 1 is made to have a tendency to be over, and is canceled by the image plane fluctuation through the second optical system 2. As a result, it is possible to satisfactorily correct field curvature. In addition, in a case of a configuration in which Conditional Expression (8-1) is satisfied instead of Conditional Expression (8), it is possible to obtain more favorable characteristics.

$$-0.8 < Pzn \times Ymax < -0.3 \tag{8}$$

$$-0.7 < Pzn \times Ymax < -0.4 \tag{8-1}$$

The first optical system 1 has the negative lens group GN and a positive lens that is disposed consecutively to the negative lens group GN on the reduction side of the negative lens group GN and satisfies Conditional Expressions (7) and (8), there is an advantage in obtaining more favorable characteristics.

Assuming that a Petzval sum of the first optical system 1 is Pz1 and a focal length of the first optical system 1 is f1, it is preferable that Conditional Expression (9) is satisfied. By not allowing the result of Conditional Expression (9) to be equal to or less than the lower limit, overcorrection is prevented in a case where the image plane fluctuation is canceled through the first optical system 1 and the second optical system 2. As a result, it is possible to satisfactorily correct field curvature. By not allowing the result of Conditional Expression (9) to be equal to or greater than the upper limit, the field curvature of the first optical system 1 is made to have a tendency to be over, and is canceled by the image plane fluctuation through the second optical system 2. As a result, it is possible to satisfactorily correct field curvature. In addition, in a case of a configuration in which Conditional Expression (9-1) is satisfied instead of Conditional Expression (9), it is possible to obtain more favorable characteristics.

$$-0.6 < Pz1 \times f1 < -0.1 \tag{9}$$

$$-0.5 < Pz1 \times f1 < -0.2 \tag{9-1}$$

Assuming that a Petzval sum of the first optical system 1 is Pz1 and a maximum image height on the reduction side is Ymax, it is preferable that Conditional Expression (10) is satisfied. By not allowing the result of Conditional Expression (10) to be equal to or less than the lower limit, overcorrection is prevented in a case where the image plane fluctuation is canceled through the first optical system 1 and the second optical system 2. As a result, it is possible to satisfactorily correct field curvature. By not allowing the result of Conditional Expression (10) to be equal to or greater than the upper limit, the field curvature of the first optical system 1 is made to have a tendency to be over, and is canceled by the image plane fluctuation through the second optical system 2. As a result, it is possible to satisfactorily correct field curvature. In addition, in a case of a configuration in which Conditional Expression (10-1) is satisfied instead of Conditional Expression (10), it is possible to obtain more favorable characteristics.

$$-0.6 < Pz1 \times Ymax < -0.1 \tag{10}$$

$$-0.5 < Pz1 \times Ymax < -0.2 \tag{10-1}$$

In a case where Conditional Expressions (9) and (10) are satisfied, there is an advantage in obtaining more favorable characteristics.

Assuming that a Petzval sum of the second optical system 2 is Pz2 and a focal length of the second optical system 2 is f2, it is preferable that Conditional Expression (11) is satisfied. By not allowing the result of Conditional Expression (11) to be equal to or less than the lower limit, the field curvature of the first optical system 1 is made to have a tendency to be over, and is canceled by the image plane fluctuation through the second optical system 2. As a result, it is possible to satisfactorily correct field curvature. By not allowing the result of Conditional Expression (11) to be equal to or greater than the upper limit, overcorrection is prevented in a case where the image plane fluctuation is canceled through the first optical system 1 and the second optical system 2. As a result, it is possible to satisfactorily correct field curvature. In addition, in a case of a configuration in which Conditional Expression (11-1) is satisfied instead of Conditional Expression (11), it is possible to obtain more favorable characteristics.

$$2.5 < Pz2 \times f2 < 6 \tag{11}$$

$$3 < Pz2 \times f2 < 5.5 \tag{11-1}$$

Assuming that a Petzval sum of the second optical system 2 is Pz2 and a maximum image height on the reduction side is Ymax, it is preferable that Conditional Expression (12) is satisfied. By not allowing the result of Conditional Expression (12) to be equal to or less than the lower limit, the field curvature of the first optical system 1 is made to have a tendency to be over, and is canceled by the image plane fluctuation through the second optical system 2. As a result, it is possible to satisfactorily correct field curvature. By not allowing the result of Conditional Expression (12) to be equal to or greater than the upper limit, overcorrection is prevented in a case where the image plane fluctuation is canceled through the first optical system 1 and the second optical system 2. As a result, it is possible to satisfactorily correct field curvature. In addition, in a case of a configuration in which Conditional Expression (12-1) is satisfied instead of Conditional Expression (12), it is possible to obtain more favorable characteristics.

$$0.1 < Pz2 \times Ymax < 0.6 \tag{12}$$

$$0.15 < Pz2 \times Ymax < 0.55 \tag{12-1}$$

In a case where Conditional Expressions (11) and (12) are satisfied, there is an advantage in obtaining more favorable characteristics.

Assuming that a Petzval sum of the first optical system 1 is Pz1 and a Petzval sum of the second optical system 2 is Pz2, it is preferable that Conditional Expression (13) is satisfied. By satisfying Conditional Expression (13), it is possible to satisfactorily correct field curvature. In addition, in a case of a configuration in which Conditional Expression (13-1) is satisfied, it is possible to obtain more favorable characteristics.

$$-1.2 < Pz2/Pz1 < -0.7 \tag{13}$$

$$-1.1 < Pz2/Pz1 < -0.8 \tag{13-1}$$

In a case where the cemented lens CE of the second optical system 2 consists of one negative lens and one positive lens, assuming that an Abbe number of the negative lens within the cemented lens CE at the d line is νn and an Abbe number of the positive lens within the cemented lens CE at the d line is νp, it is preferable that Conditional Expression (14) is satisfied. By satisfying Conditional Expression (14), it is possible to satisfactorily suppress longitudinal chromatic aberration. In addition, in a case of a configuration in which Conditional Expression (14-1) is satisfied, it is possible to obtain more favorable characteristics.

$$-52 < \nu n - \nu p < -26 \quad (14)$$

$$-50 < \nu n - \nu p < -28 \quad (14\text{-}1)$$

Assuming that a focal length of the imaging optical system is f and a focal length of the second optical system 2 is f2, it is preferable that Conditional Expression (15) is satisfied. By not allowing the result of Conditional Expression (15) to be equal to or less than the lower limit, there is an advantage in minimizing the total length of the lens system. By not allowing the result of the conditional expression (15) to be equal to or greater than the upper limit, it becomes easy to suppress field curvature. In addition, in a case of a configuration in which Conditional Expression (15-1) is satisfied, it is possible to obtain more favorable characteristics.

$$0.01 < |f|/f2 < 0.1 \quad (15)$$

$$0.015 < |f|/f2 < 0.095 \quad (15\text{-}1)$$

Assuming that a focal length of the imaging optical system is f and a focal length of the first optical system 1 is f1, it is preferable that Conditional Expression (16) is satisfied. By not allowing the result of Conditional Expression (16) to be equal to or less than the lower limit, there is an advantage in minimizing the total length of the lens system. By not allowing the result of the conditional expression (16) to be equal to or greater than the upper limit, it becomes easy to suppress field curvature. In addition, in a case of a configuration in which Conditional Expression (16-1) is satisfied, it is possible to obtain more favorable characteristics.

$$0.1 < |f|/f1 < 0.5 \quad (16)$$

$$0.15 < |f|/f1 < 0.4 \quad (16\text{-}1)$$

In the example shown in FIG. 1, the first optical system 1 consists of ten lenses and the second optical system 2 consists of four lenses. However, the first optical system 1 and the second optical system 2 each may be configured to have a different number of lenses from the example shown in FIG. 1.

The above-mentioned preferred configurations and available configurations may be arbitrary combinations, and it is preferable to selectively adopt the configurations in accordance with required specification. According to the present embodiment, since reduction in weight is achieved, it is possible to realize a high optical performance imaging optical system that has a small F number with a wide angle. It should be noted that the term "small F number" described herein means that the F number is equal to or less than 1.8, and the term "wide angle" means that the total angle of view is greater than 120°.

Next, numerical examples of the imaging optical system of the present invention will be described.

Example 1

A lens configuration and an optical path of an imaging optical system of Example 1 are shown in FIG. 1, and a configuration and an illustration method thereof is as described above. Therefore, repeated descriptions are partially omitted herein. The imaging optical system of Example 1 consists of, in order from the magnification side, a first optical system 1 and a second optical system 2. The first optical system 1 consists of negative lenses L1a to L1c, positive lenses L1d to L1f, a negative lens L1g, and positive lenses L1h to L1j, in order from the magnification side. The second optical system 2 consists of a positive lens L2a, a negative lens L2b, and positive lenses L2c to L2d, in order from the magnification side. The lenses L1a, L1b, and L1c compose a negative lens group GN. The lenses L1f, L1g, and L1h are cemented to each other so as to compose a three-piece cemented lens. The lenses L2b and L2c are cemented to each other so as to compose a cemented lens CE having a positive refractive power as a whole. Focusing is performed by moving the lens L1e in the optical axis direction.

Table 1 shows basic lens data of the imaging optical system of Example 1, Table 2 shows specification, and Table 3 shows aspheric surface coefficients thereof. In Table 1, the column of the surface number shows surface numbers. The surface closest to the magnification side is the first surface, and the surface numbers increase one by one toward the reduction side. The column of R shows radii of curvature of the respective surfaces. The column of D shows surface distances on the optical axis between the respective surfaces and the surfaces adjacent to the reduction side. Further, the column of Nd shows refractive indexes of the respective components at the d line (a wavelength of 587.6 nm (nanometers)), and the column of νd shows Abbe numbers of the respective components at the d line. Here, reference signs of radii of curvature of surface shapes convex toward the magnification side are set to be positive, and reference signs of radii of curvature of surface shapes convex toward the reduction side are set to be negative. Table 1 additionally shows the optical member PP.

In Table 2, the absolute value |f| of the focal length of the imaging optical system, the F number FNo., the maximum total angle of view 2ω, and the value of the maximum image height Ymax on the reduction side are based on the d line. [°] in the place of 2ω indicates that the unit thereof is a degree.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces, and aspheric surface coefficients of the respective aspheric surfaces. The "E±n" (n: an integer) in numerical values of the aspheric surface coefficients of Table 3 indicates "×10$^{±n}$". The aspheric surface coefficients are values of the coefficients KA and Am (m=3, 4, 5, . . . , 20) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Surface Number | R | D | Nd | νd |
|---|---|---|---|---|
| *1 | −8.2641 | 5.3322 | 1.53158 | 55.08 |
| *2 | −13.8257 | 4.0185 | | |
| 3 | 71.2012 | 2.0601 | 1.75500 | 52.32 |
| 4 | 15.4106 | 17.6055 | | |
| 5 | −33.2885 | 5.7369 | 1.64850 | 53.03 |
| 6 | 33.5835 | 5.4599 | | |
| 7 | 52.6156 | 9.3362 | 1.83481 | 42.72 |
| 8 | −52.7790 | 15.1774 | | |
| 9 | 52.6476 | 4.0002 | 1.67790 | 55.34 |
| 10 | 357.6832 | 32.2080 | | |
| 11 | 75.7427 | 17.1941 | 1.59282 | 68.62 |
| 12 | −22.3113 | 1.3006 | 1.64769 | 33.84 |
| 13 | 30.8865 | 17.9113 | 1.53775 | 74.70 |
| 14 | −51.8894 | 4.4000 | | |
| *15 | −33.1547 | 4.5010 | 1.51007 | 56.24 |
| *16 | −26.5888 | 36.5879 | | |
| 17 | 106.1260 | 7.4338 | 1.84666 | 23.78 |
| 18 | 768.3830 | 188.7550 | | |
| 19 | −6161.2774 | 8.9741 | 1.83481 | 42.72 |
| 20 | −138.5945 | 132.5308 | | |
| 21 | 52.8565 | 0.9990 | | |
| 22 | 26.0380 | 7.6795 | 1.59282 | 68.62 |
| 23 | −254.7677 | 43.0595 | | |
| 24 | 80.6000 | 4.4991 | 1.84666 | 23.78 |
| 25 | −90.0705 | 9.1000 | | |
| 26 | ∞ | 25.0000 | 1.51633 | 64.14 |
| 27 | ∞ | | | |

TABLE 2

Example 1

| |f| | 3.60 |
|---|---|
| FNo. | 1.80 |
| 2ω[°] | 143.0 |
| Ymax | 10.75 |

TABLE 3

Example 1

| Surface Number | 1 | 2 | 15 | 16 |
|---|---|---|---|---|
| KA | −1.4999958E+00 | −1.1383152E−02 | −1.2568157E+00 | 8.0365857E−01 |
| A3 | 2.3946645E−03 | 2.6732962E−03 | −4.4285021E−04 | −3.6112675E−04 |
| A4 | −6.1407254E−05 | −1.2925596E−04 | 1.9280574E−04 | 1.5655044E−04 |
| A5 | −4.0496047E−06 | 4.7574879E−05 | −1.8911857E−05 | −8.7512885E−06 |
| A6 | 2.4989445E−07 | −6.1606055E−06 | 4.6685926E−07 | −4.1942113E−07 |
| A7 | 9.2069235E−10 | 3.5967392E−07 | 4.8685096E−08 | 6.9668190E−08 |
| A8 | −3.3444491E−10 | −9.8607657E−09 | −2.9292324E−09 | −6.3218583E−10 |
| A9 | 3.1346345E−12 | 1.1297081E−10 | −6.9293615E−11 | −2.2701915E−10 |
| A10 | 2.5793211E−13 | 3.4415417E−13 | 6.7770150E−12 | 5.8263558E−12 |
| A11 | −4.1025473E−15 | −2.9506928E−13 | 4.6173769E−14 | 3.9036316E−13 |
| A12 | −1.2304710E−16 | 1.9314604E−14 | −8.6192796E−15 | −1.3427699E−14 |
| A13 | 2.4076524E−18 | −1.6059632E−16 | −5.1069823E−18 | −3.8656891E−16 |
| A14 | 3.6897007E−20 | −1.9079382E−17 | 6.5478391E−18 | 1.5803085E−17 |
| A15 | −7.7006545E−22 | 5.0189840E−19 | −1.0448290E−20 | 2.2283507E−19 |
| A16 | −6.7652093E−24 | −2.6680865E−23 | −2.9555063E−21 | −1.0363904E−20 |
| A17 | 1.2979017E−25 | 2.2209735E−23 | 5.5035485E−24 | −6.9681336E−23 |
| A18 | 6.9211982E−28 | −7.0718241E−24 | 7.3094425E−25 | 3.6044270E−24 |
| A19 | −9.0321368E−30 | 1.6353785E−25 | −8.5305775E−28 | 9.1385801E−27 |
| A20 | −3.0219929E−32 | −1.1543377E−27 | −7.6252023E−29 | −5.1913539E−28 |

Figure 4:
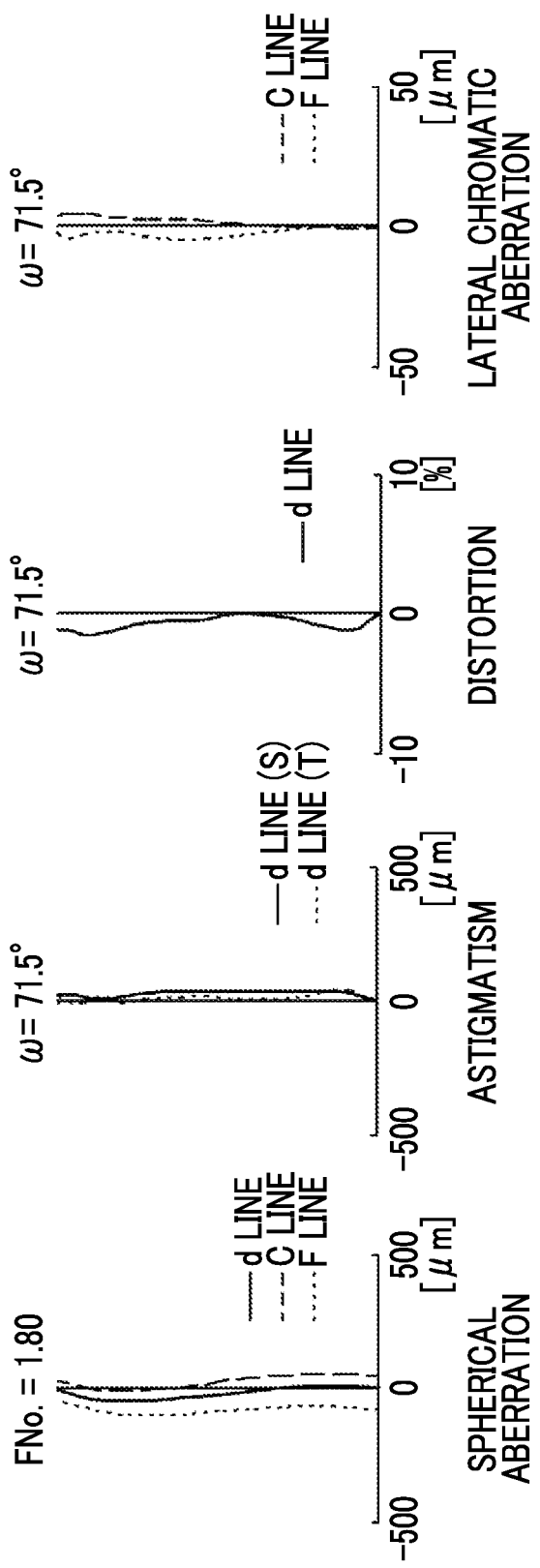
FIG. 4 is a diagram of aberrations of the imaging optical system of Example 1 of the present invention.

FIG. 4 shows aberration diagrams of spherical aberration, astigmatism, distortion, and lateral chromatic aberration of the imaging optical system of Example 1 in order from the left side. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view. The diagrams shown in FIG. 4 are diagrams in a case where the distance on the optical axis from the lens surface closest to the magnification side to the magnification side imaging surface is 0.47 m.

In the description of Example 1, reference signs, meanings, and description methods of the respective data pieces are the same as those in the following examples unless otherwise noted. Therefore, in the following description, repeated description will be omitted.

Example 2

Figure 2:
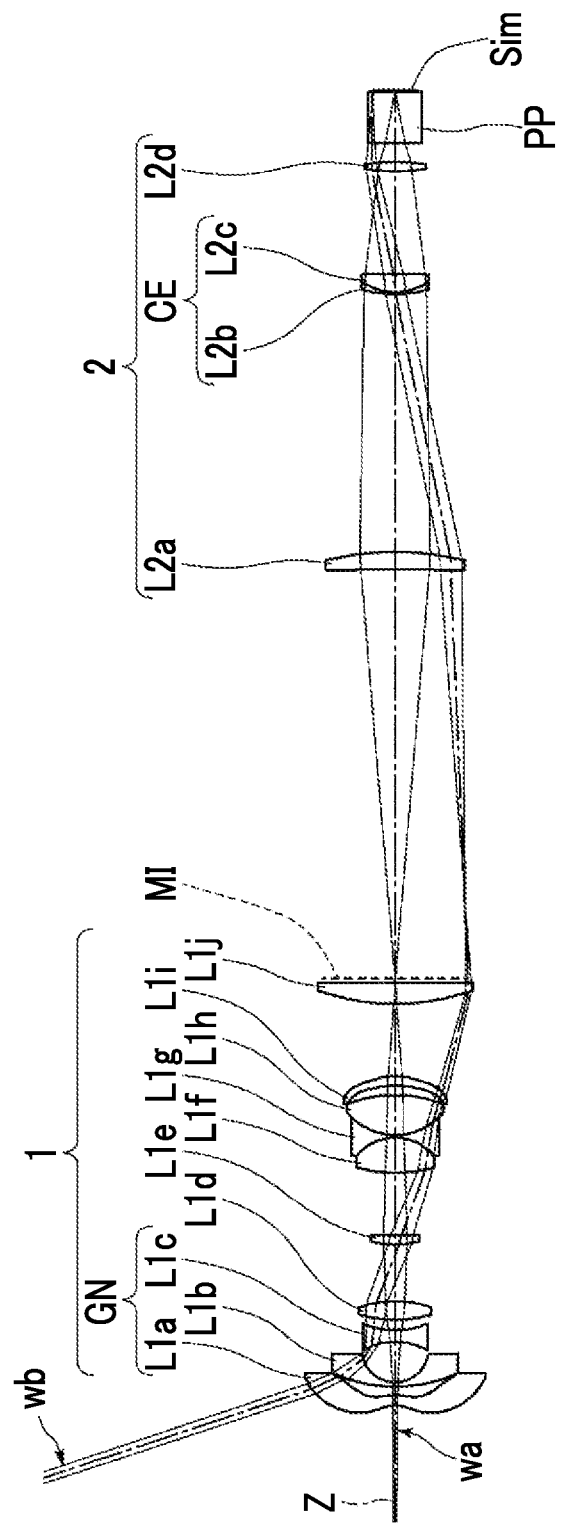
FIG. 2 is a cross-sectional view illustrating a configuration and an optical path of an imaging optical system of Example 2 of the present invention.

FIG. 2 is a cross-sectional view of a lens configuration and an optical path of an imaging optical system of Example 2. In FIG. 2, the intermediate image MI is conceptually shown, and its position in the direction of the optical axis is basically shown as the position in the vicinity of the optical axis. The imaging optical system of Example 2 consists of, in order from the magnification side, a first optical system 1 and a second optical system 2. The number of lenses composing the first optical system 1, the sign of the refractive power of each lens, the number of lenses composing the second optical system 2, the sign of the refractive power of each lens, and the lens which moves during focusing are similar to those of Example 1.

Figure 5:
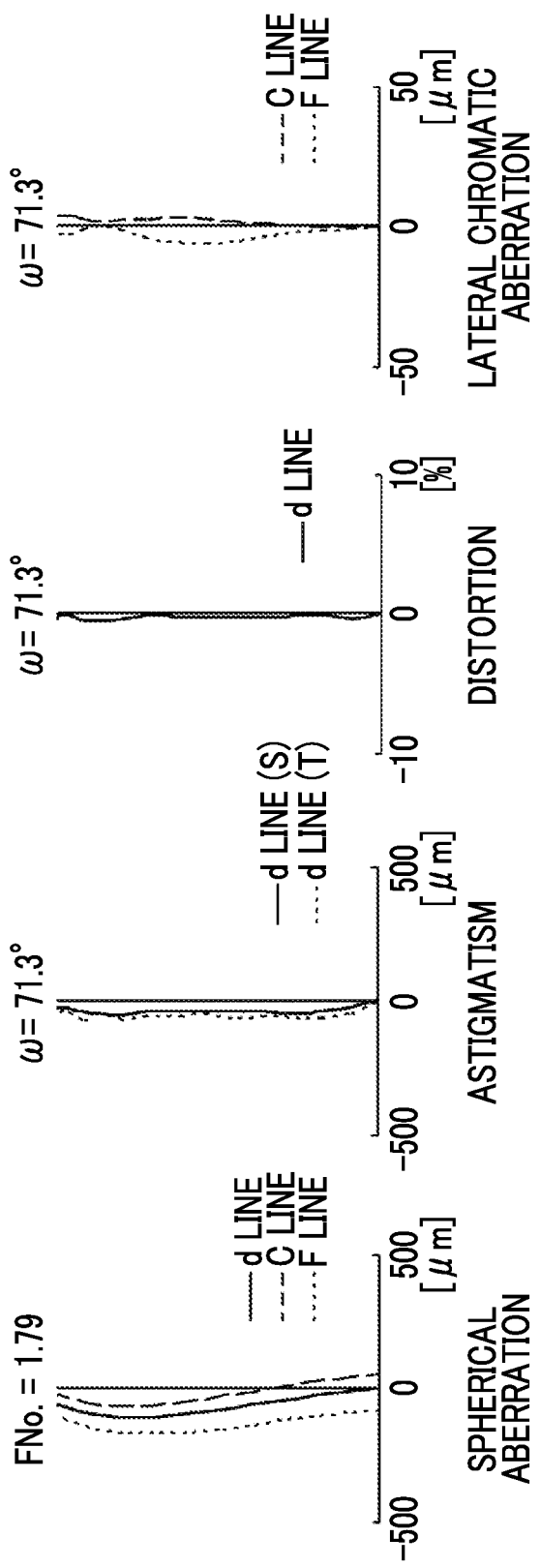
FIG. 5 is a diagram of aberrations of the imaging optical system of Example 2 of the present invention.

Table 4 shows basic lens data of the imaging optical system of Example 2, Table 5 shows specification, Table 6 shows aspheric surface coefficients, and FIG. 5 shows aberration diagrams. The diagrams shown in FIG. 5 are diagrams in a case where the distance on the optical axis from the lens surface closest to the magnification side to the magnification side imaging surface is 0.47 m.

TABLE 4

Example 2

| Surface Number | R | D | Nd | νd |
|---|---|---|---|---|
| *1 | −8.1505 | 4.7817 | 1.53158 | 55.08 |
| *2 | −13.9188 | 4.1380 | | |
| 3 | 72.1695 | 2.0971 | 1.77250 | 49.62 |
| 4 | 15.9346 | 19.5487 | | |
| 5 | −30.8380 | 5.8715 | 1.65160 | 58.55 |
| 6 | 39.9915 | 5.0658 | | |
| 7 | 60.3438 | 8.9883 | 1.83481 | 42.72 |
| 8 | −49.5325 | 27.4817 | | |
| 9 | 44.4406 | 4.5360 | 1.59282 | 68.62 |
| 10 | 399.0062 | 30.6915 | | |
| 11 | 66.9803 | 17.0323 | 1.59282 | 68.62 |
| 12 | −23.6227 | 1.2993 | 1.68893 | 31.16 |
| 13 | 29.3078 | 19.3647 | 1.53775 | 74.70 |
| 14 | −60.7360 | 4.7730 | | |
| *15 | −27.1126 | 4.5086 | 1.51007 | 56.24 |
| *16 | −22.3500 | 35.0730 | | |
| 17 | 109.9040 | 10.2106 | 1.84666 | 23.78 |
| 18 | 5752.5002 | 199.9987 | | |
| 19 | −1630.0189 | 8.5000 | 1.83481 | 42.72 |
| 20 | −134.4849 | 125.5516 | | |
| 21 | 57.4098 | 1.0008 | 1.84666 | 23.78 |
| 22 | 27.9999 | 8.8357 | 1.59282 | 68.62 |
| 23 | −252.3368 | 49.8739 | | |
| 24 | 97.8544 | 4.5010 | 1.92286 | 20.88 |
| 25 | −91.1934 | 9.1000 | | |
| 26 | ∞ | 25.0000 | 1.51633 | 64.14 |
| 27 | ∞ | | | |

TABLE 5

Example 2

| |f| | 3.60 |
|---|---|
| FNo. | 1.79 |
| 2ω[°] | 142.6 |
| Ymax | 10.75 |

TABLE 6

Example 2

| Surface Number | 1 | 2 | 15 | 16 |
|---|---|---|---|---|
| KA | −9.4077123E−01 | 6.9167367E−03 | 1.2132893E+00 | 6.9507506E−01 |
| A3 | 3.1764698E−03 | 2.7615604E−03 | −2.0438065E−04 | −3.5222927E−04 |
| A4 | −9.3811949E−05 | −1.4936463E−04 | 1.6513885E−04 | 1.7010431E−04 |
| A5 | −4.8655612E−06 | 4.8167827E−05 | −1.2284473E−05 | −8.7916919E−06 |
| A6 | 3.3962205E−07 | −6.2004895E−06 | 1.8666289E−07 | −2.7480452E−07 |
| A7 | 1.6300228E−10 | 3.7671793E−07 | 2.7667061E−08 | 5.1857719E−08 |
| A8 | −4.4203958E−10 | −1.0923612E−08 | −1.1498411E−09 | −8.4509156E−10 |
| A9 | 5.6477053E−12 | 1.0126872E−10 | −4.5807173E−11 | −1.3349034E−10 |
| A10 | 3.2291467E−13 | 2.1726518E−12 | 2.4625422E−12 | 4.3708682E−12 |
| A11 | −6.7017425E−15 | −2.7328367E−13 | 4.8364254E−14 | 1.8046184E−13 |
| A12 | −1.3722357E−16 | 1.7391016E−14 | −2.8288733E−15 | −7.8742300E−15 |
| A13 | 3.8282854E−18 | −2.2228934E−16 | −3.1717436E−17 | −1.3676194E−16 |
| A14 | 3.1929131E−20 | −1.7095840E−17 | 1.9199068E−18 | 7.5360612E−18 |
| A15 | −1.2083622E−21 | 5.7994196E−19 | 1.2580213E−20 | 5.8120607E−20 |
| A16 | −2.9387204E−24 | −2.2350932E−21 | −7.6931005E−22 | −4.0715705E−21 |
| A17 | 2.0195645E−25 | 8.0274762E−24 | −2.7622761E−24 | −1.2767124E−23 |
| A18 | −1.9203799E−28 | −6.9337704E−24 | 1.6821341E−25 | 1.1733705E−24 |

TABLE 6-continued

Example 2

| Surface Number | 1 | 2 | 15 | 16 |
|---|---|---|---|---|
| A19 | −1.3970253E−29 | 1.8258601E−25 | 2.5730754E−28 | 1.0981766E−27 |
| A20 | 4.2833716E−32 | −1.3991719E−27 | −1.5468652E−29 | −1.4047150E−28 |

Example 3

Figure 3:
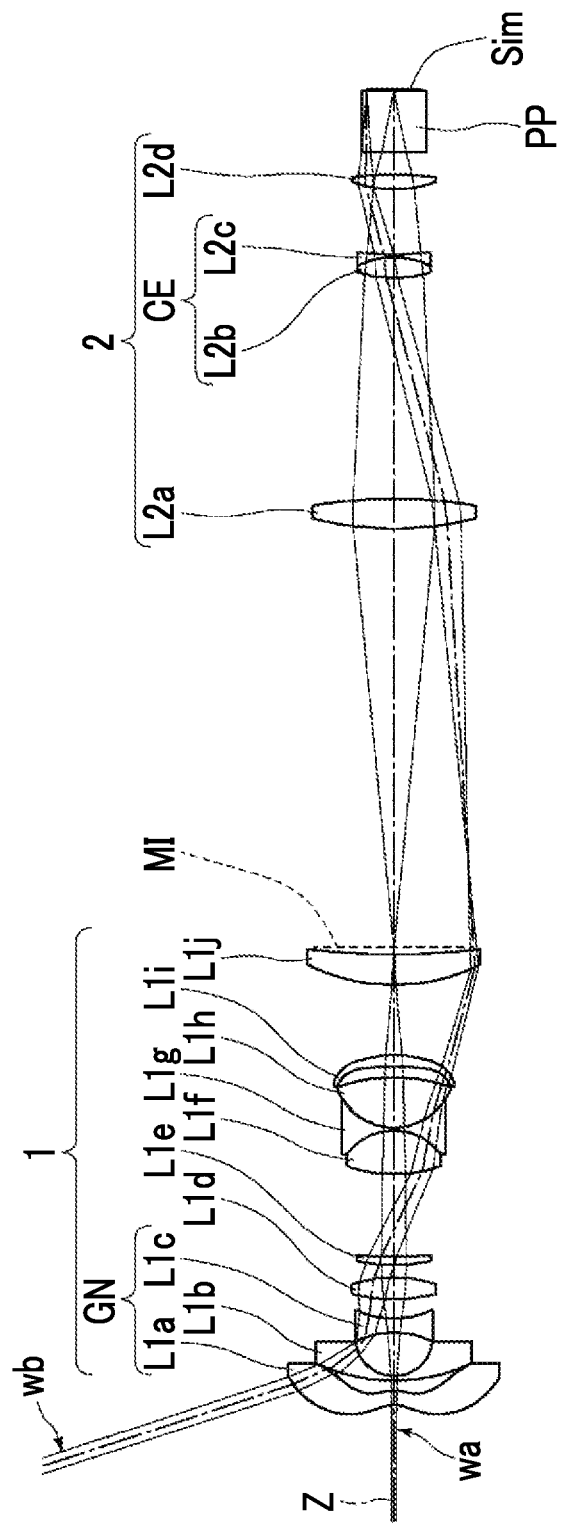
FIG. 3 is a cross-sectional view illustrating a configuration and an optical path of an imaging optical system of Example 3 of the present invention.

FIG. 3 is a cross-sectional view of a lens configuration and an optical path of an imaging optical system of Example 3. In FIG. 3, the intermediate image MI is conceptually shown, and its position in the direction of the optical axis is basically shown as the position in the vicinity of the optical axis. The imaging optical system of Example 3 consists of, in order from the magnification side, a first optical system 1 and a second optical system 2. The second optical system 2 consists of positive lenses L2a to L2b, a negative lens L2c, and a positive lens L2d, in order from the magnification side. The two lenses L2b and L2c are cemented to each other so as to compose a cemented lens CE having a positive refractive power as a whole. The number of lenses composing the first optical system 1, the sign of the refractive power of each lens, and the lens which moves during focusing are similar to those in the first embodiment.

Figure 6:
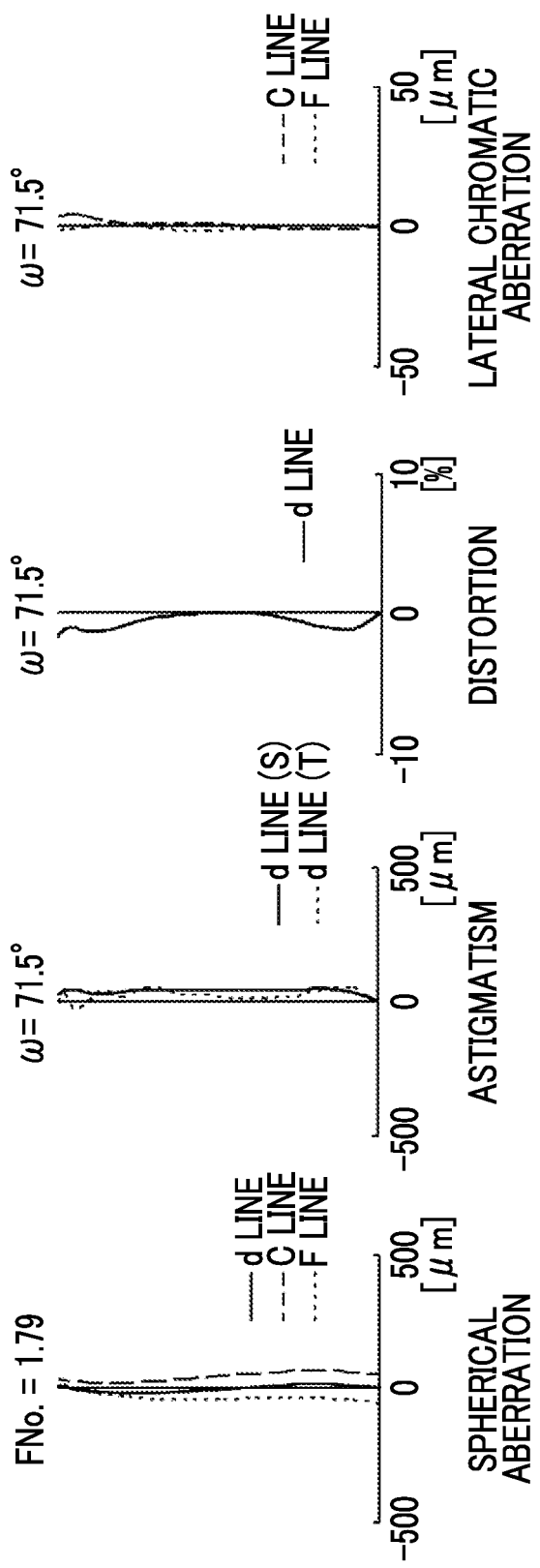
FIG. 6 is a diagram of aberrations of the imaging optical system of Example 3 of the present invention.

Table 7 shows basic lens data of the imaging optical system of Example 3, Table 8 shows specification, Table 9 shows aspheric surface coefficients, and FIG. 6 shows aberration diagrams. The diagrams shown in FIG. 6 are diagrams in a case where the distance on the optical axis from the lens surface closest to the magnification side to the magnification side imaging surface is 0.47 m.

TABLE 7

Example 3

| Surface Number | R | D | Nd | vd |
|---|---|---|---|---|
| *1 | −8.1114 | 5.5829 | 1.53158 | 55.08 |
| *2 | −13.8290 | 4.1297 | | |
| 3 | 71.3536 | 1.9083 | 1.74100 | 52.64 |
| 4 | 15.4106 | 17.6055 | | |
| 5 | −33.0583 | 5.6157 | 1.62041 | 60.29 |
| 6 | 34.2353 | 7.8890 | | |
| 7 | 68.9951 | 8.7488 | 1.83481 | 42.72 |
| 8 | −50.9127 | 5.0360 | | |
| 9 | 62.1366 | 3.5521 | 1.67790 | 55.34 |
| 10 | 393.2083 | 33.6664 | | |
| 11 | 55.0690 | 17.7273 | 1.59282 | 68.62 |
| 12 | −22.9498 | 1.3001 | 1.64769 | 33.84 |
| 13 | 24.4061 | 19.9654 | 1.53775 | 74.70 |
| 14 | −63.4478 | 4.4005 | | |
| *15 | −57.9178 | 4.6103 | 1.51007 | 56.24 |
| *16 | −30.8469 | 28.3705 | | |
| 17 | 76.5959 | 12.4359 | 1.84666 | 23.78 |
| 18 | 300.8261 | 172.6316 | | |
| 19 | 130.2450 | 12.0000 | 1.69100 | 54.82 |
| 20 | −197.5014 | 90.0010 | | |
| 21 | 46.1134 | 8.0101 | 1.71299 | 53.87 |
| 22 | −30.9987 | 1.0884 | 1.84666 | 23.78 |
| 23 | 108.0262 | 26.4147 | | |
| 24 | 47.8510 | 5.8238 | 1.84666 | 23.78 |
| 25 | −165.8520 | 9.1000 | | |
| 26 | ∞ | 25.0000 | 1.51633 | 64.14 |
| 27 | ∞ | | | |

TABLE 8

Example 3

| |f| | 3.60 |
|---|---|
| FNo. | 1.79 |
| 2ω[°] | 143.0 |
| Ymax | 10.75 |

TABLE 9

Example 3

| Surface Number | 1 | 2 | 15 | 16 |
|---|---|---|---|---|
| KA | −1.4998645E+00 | −9.6400161E−03 | −1.0404666E−01 | 1.4927654E+00 |
| A3 | 2.3762232E−03 | 2.6717237E−03 | −3.4269866E−04 | −2.5163964E−04 |
| A4 | −6.1149730E−05 | −1.2900063E−04 | 1.4048146E−04 | 1.1290776E−04 |
| A5 | −4.0116307E−06 | 4.7996624E−05 | −9.8948805E−06 | −2.6930068E−06 |
| A6 | 2.4771547E−07 | −6.1716736E−06 | 2.5666180E−08 | −5.1842590E−07 |
| A7 | 9.1950205E−10 | 3.5731925E−07 | 2.2906814E−08 | 3.6944288E−08 |
| A8 | −3.3186788E−10 | −9.8779365E−09 | −6.0656628E−10 | 5.2697530E−10 |
| A9 | 3.0641927E−12 | 1.2429338E−10 | −3.3697665E−11 | −1.4559840E−10 |
| A10 | 2.5714782E−13 | 3.5288449E−13 | 1.1795890E−12 | 2.6766407E−12 |
| A11 | −4.0005841E−15 | −3.1843888E−13 | 2.7703398E−14 | 2.6494214E−13 |
| A12 | −1.2380637E−16 | 1.9336626E−14 | −1.1547319E−15 | −9.5449401E−15 |
| A13 | 2.3372356E−18 | −1.3385058E−16 | −1.2665647E−17 | −2.5760154E−16 |
| A14 | 3.7671013E−20 | −1.9096579E−17 | 6.6038503E−19 | 1.3837823E−17 |
| A15 | −7.4323380E−22 | 4.8428958E−19 | 3.1038928E−21 | 1.3749127E−19 |
| A16 | −7.0549813E−24 | −5.3780432E−23 | −2.2243501E−22 | −1.0566164E−20 |
| A17 | 1.2440029E−25 | 2.9586799E−23 | −3.5185770E−25 | −3.7393883E−23 |
| A18 | 7.4317618E−28 | −7.0855671E−24 | 4.0860778E−26 | 4.1752703E−24 |
| A19 | −8.5882990E−30 | 1.6294892E−25 | 1.0681142E−29 | 3.8886791E−27 |
| A20 | −3.3744833E−32 | −1.1603482E−27 | −3.1564791E−30 | −6.7391314E−28 |

Table 10 shows values corresponding to Conditional Expressions (1) to (16) of the imaging optical systems of Examples 1 to 3. In Examples 1 to 3, the d line is set as the reference wavelength, and the values shown in Table 10 are based on the d line.

TABLE 10

| Expression Number | | Example 1 | Example 2 | Example 3 |
|---|---|---|---|---|
| (1) | MAG2 | −0.29 | −0.29 | −0.34 |
| (2) | Dab/fp1 | 0.84 | 0.77 | 0.95 |
| (3) | Dcd/fp2 | 1.09 | 1.22 | 0.75 |
| (4) | Dcd/Dab | 0.39 | 0.47 | 0.30 |
| (5) | fp2/fp1 | 0.30 | 0.30 | 0.39 |
| (6) | MAG2/(fp2/fp1) | −0.96 | −1.00 | −0.88 |
| (7) | Pzn × fn | 0.37 | 0.36 | 0.37 |
| (8) | Pzn × Ymax | −0.67 | −0.66 | −0.67 |
| (9) | Pz1 × f1 | −0.29 | −0.28 | −0.24 |
| (10) | Pz1a × Ymax | −0.25 | −0.25 | −0.24 |
| (11) | Pz2 × f2 | 4.71 | 4.26 | 3.22 |
| (12) | Pz2 × Ymax | 0.22 | 0.21 | 0.23 |
| (13) | Pz2/Pz1 | −0.91 | −0.86 | −0.95 |
| (14) | νn − νp | −44.85 | −44.85 | −30.09 |
| (15) | |f|/f2 | 0.02 | 0.02 | 0.02 |
| (16) | |f|/f1 | 0.29 | 0.29 | 0.34 |

As can be seen from the above data, in the imaging optical systems of Examples 1 to 3, the number of lenses of the second optical system 2 is 4 such that the weight is reduced, the total angle of view is equal to or greater than 140° such that the wide angle is achieved, and the F number is equal to or less than 1.80 such that a small F number is achieved. As a result, various aberrations including chromatic aberration are satisfactorily corrected, and high optical performance is achieved.

Figure 7:
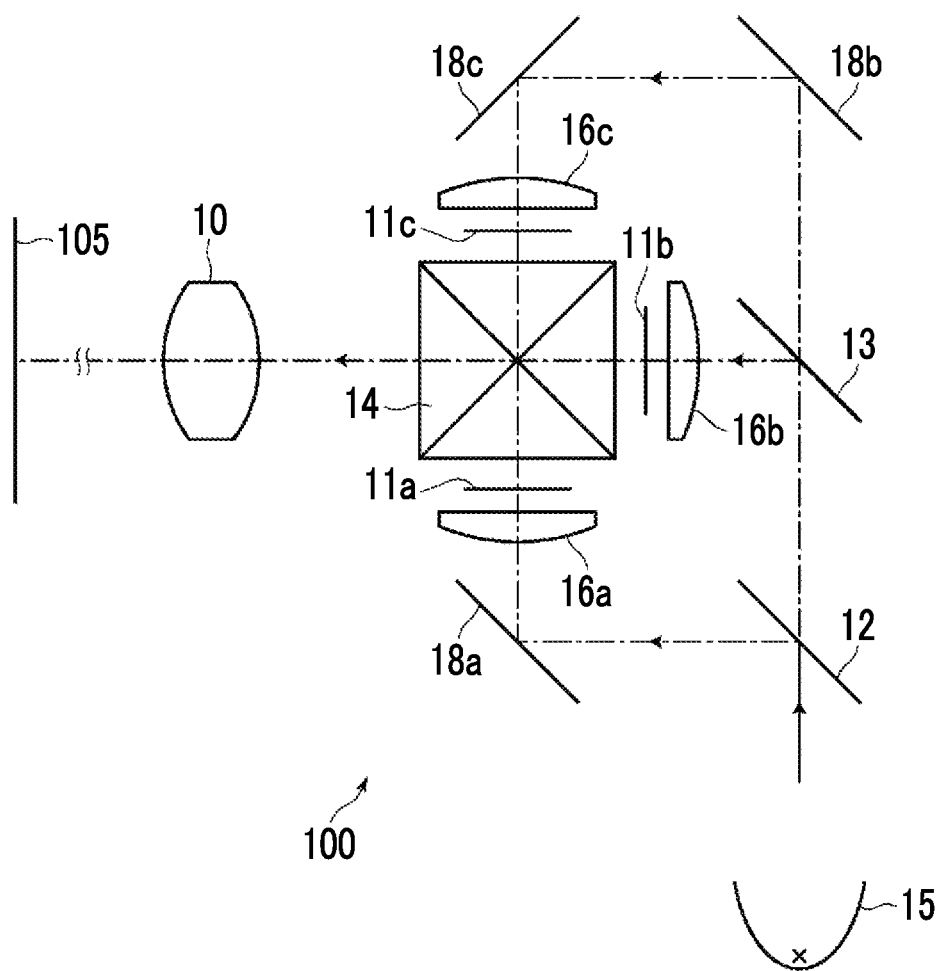
FIG. 7 is a schematic configuration diagram of a projection display device according to an embodiment of the present invention.

Next, a projection display device according to an embodiment of the present invention will be described. FIG. 7 is a schematic configuration diagram of the projection display device according to the above-mentioned embodiment of the present invention. The projection display device 100 shown in FIG. 7 has an imaging optical system 10 according to the embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical path. In FIG. 7, the imaging optical system 10 is schematically illustrated. Further, an integrator is disposed between the light source 15 and the dichroic mirror 12, but illustration thereof is omitted in FIG. 7.

White light originated from the light source 15 is separated into rays with three colors (green light, blue light, red light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light modulated through the transmissive display elements 11a to 11c, onto a screen 105.

Figure 8:
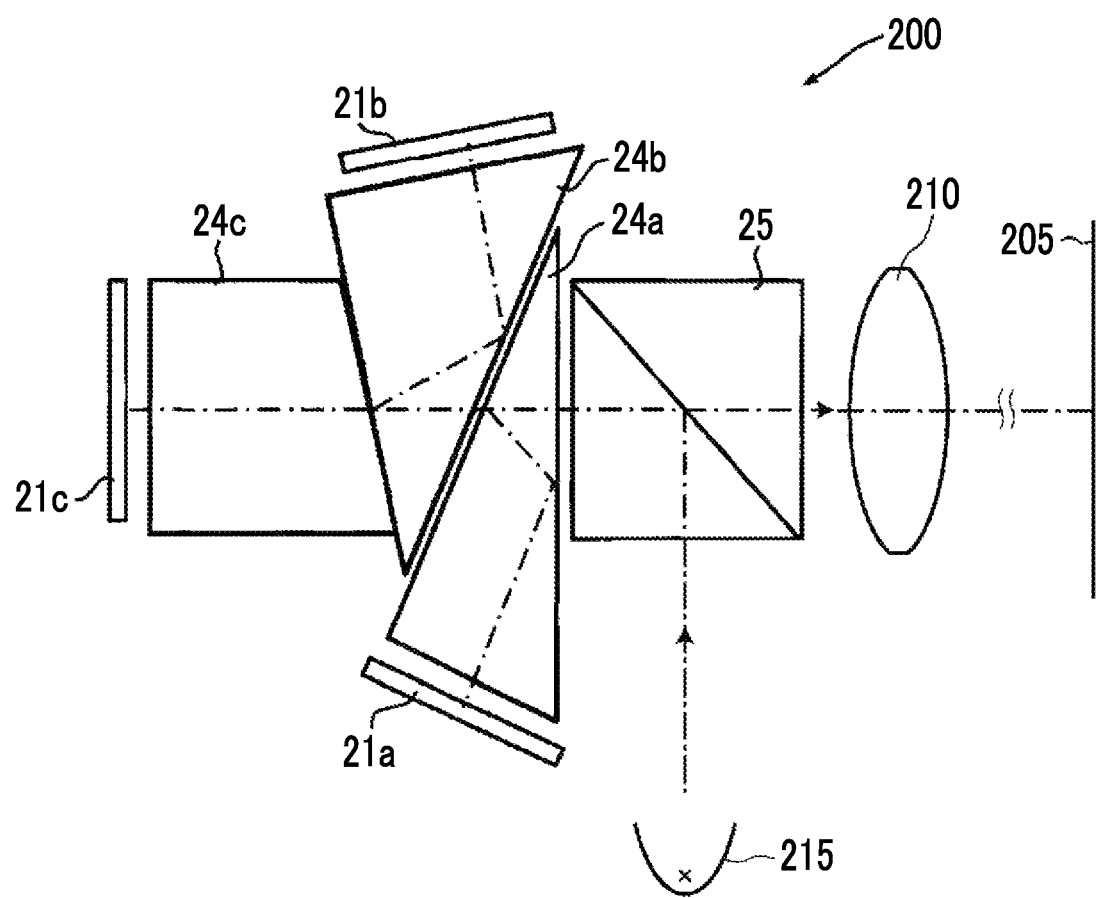
FIG. 8 is a schematic configuration diagram of a projection display device according to another embodiment of the present invention.

FIG. 8 is a schematic configuration diagram of a projection display device according to another embodiment of the present invention. The projection display device 200 shown in FIG. 8 has an imaging optical system 210 according to the embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 8, the imaging optical system 210 is schematically illustrated. Further, an integrator is disposed between the light source 215 and the polarization separating prism 25, but illustration thereof is omitted in FIG. 8.

White light originated from the light source 215 is reflected on a reflective surface inside the polarization separating prism 25, and is separated into rays with three colors (green light, blue light, red light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light modulated through the DMD elements 21a to 21c, onto a screen 205.

Figure 9:
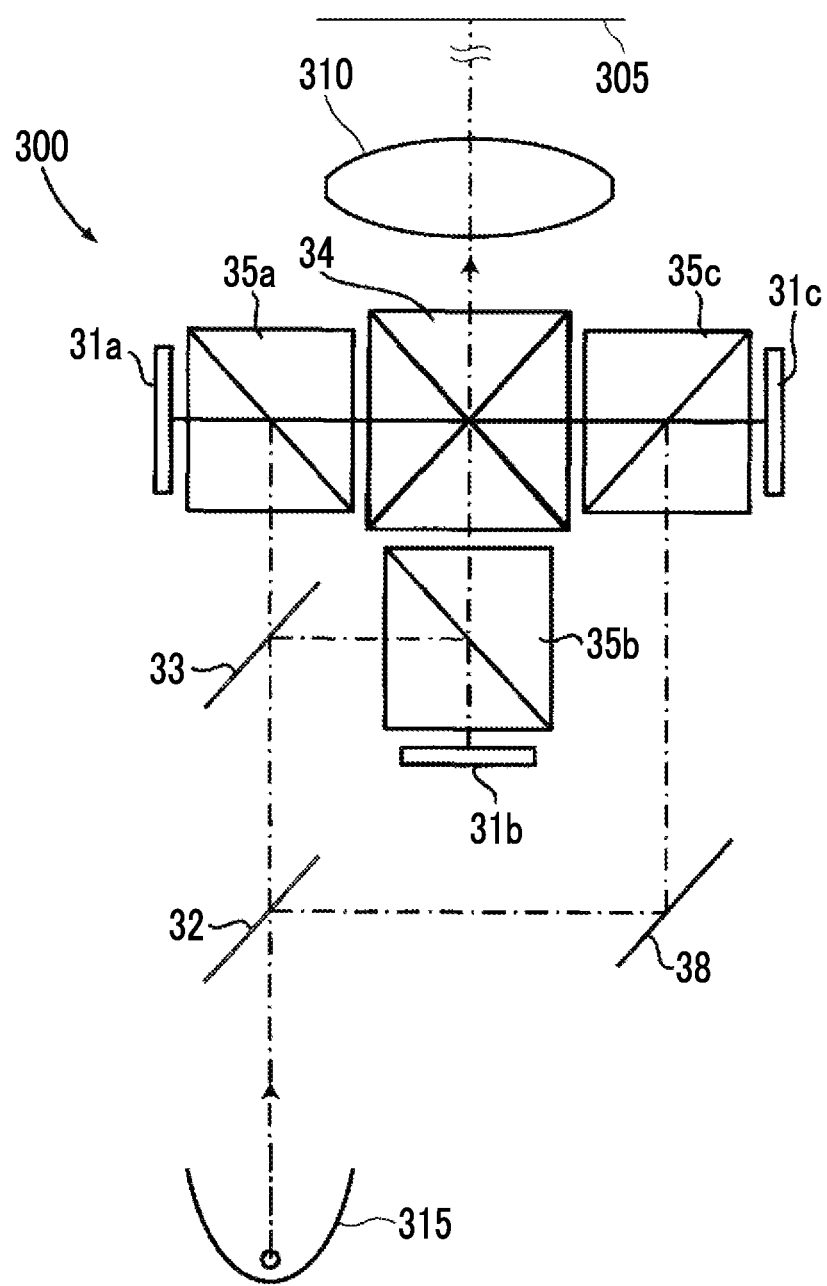
FIG. 9 is a schematic configuration diagram of a projection display device according to still another embodiment of the present invention.

FIG. 9 is a schematic configuration diagram of a projection display device according to still another embodiment of the present invention. The projection display device 300 shown in FIG. 9 has an imaging optical system 310 according to the embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical path, and polarization separating prisms 35a to 35c. In FIG. 9, the imaging optical system 310 is schematically illustrated. Further, an integrator is disposed between the light source 315 and the dichroic mirror 32, but illustration thereof is omitted in FIG. 9.

White light originated from the light source 315 is separated into rays with three colors (green light, blue light, red light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light modulated through the reflective display elements 31a to 31c, onto a screen 305.

Figure 10:
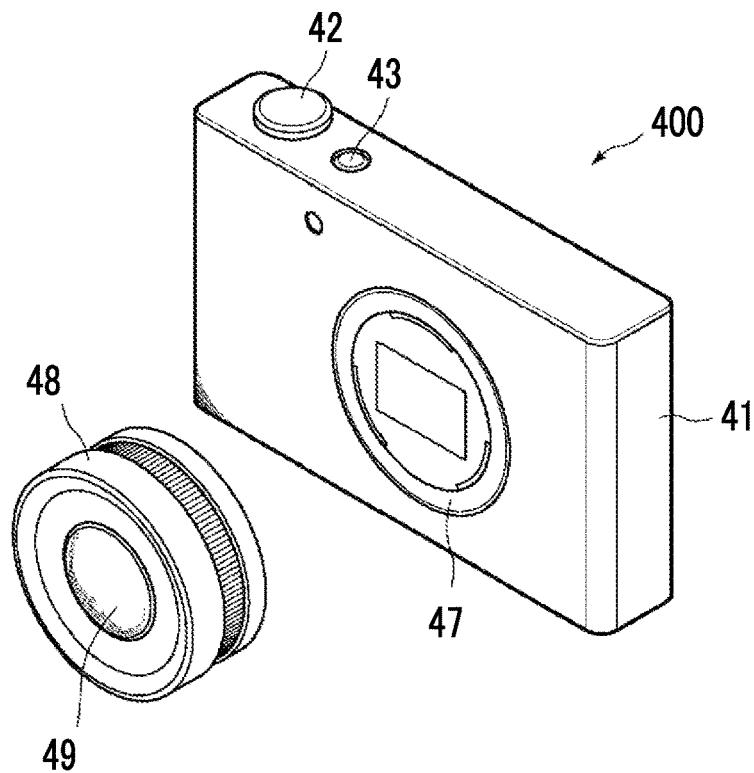
FIG. 10 is a perspective view of the front side of an imaging apparatus according to an embodiment of the present invention.
Figure 11:
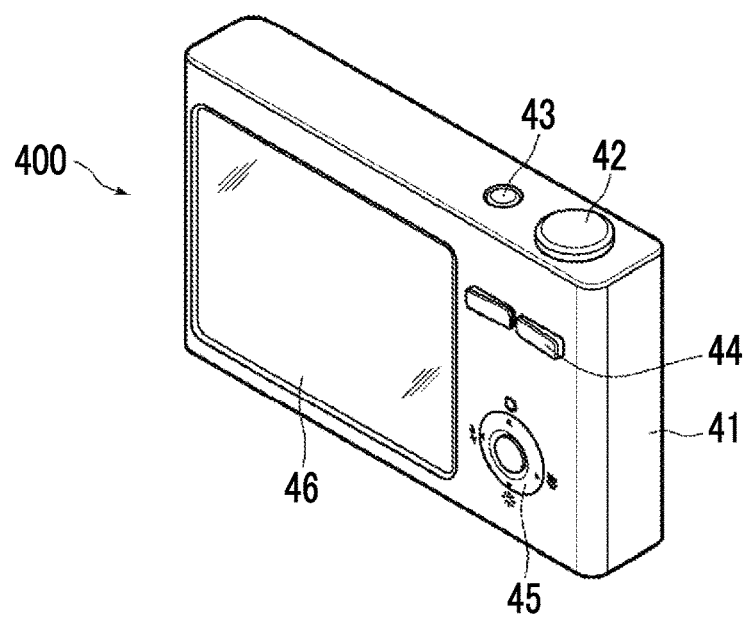
FIG. 11 is a perspective view of the rear side of the imaging apparatus shown in FIG. 10.

FIGS. 10 and 11 are external views of a camera 400 which is the imaging apparatus according to the above-mentioned embodiment of the present invention. FIG. 10 is a perspective view of the camera 400 viewed from the front side, and FIG. 11 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown in the drawing) such as a charge coupled device (CCD) outputs a captured image signal based on a subject image which is formed through the interchangeable lens 48. The signal processing circuit generates an image through processing of the captured image signal which is output from the imaging element. The recording medium records the generated image. The camera 400 is able to capture a still image or a video by pressing the shutter button 42, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric surface coefficient of each lens are not limited to the values shown in the numerical examples, and different values may be used therefor.

The projection display device of the present invention is not limited to the above-mentioned configuration. For example, the used light valve and the optical member used for ray separation or ray combining can be modified to various forms.

Further, the imaging apparatus of the present invention is not limited to the above configuration. For example, the present invention can be applied to a single-lens reflex camera, a film camera, a video camera, or the like.

What is claimed is:

1. An imaging optical system consisting of, in order from a magnification side to a reduction side:
    a first optical system; and
    a second optical system,
    wherein the second optical system forms an intermediate image at a position conjugate to a reduction side imaging surface,
    wherein the first optical system re-forms the intermediate image on a magnification side imaging surface, and
    wherein the second optical system consists of, in order from the magnification side, a first positive lens, a cemented lens having a positive refractive power as a whole, and a second positive lens, in which the cemented lens includes at least one negative lens and at least one positive lens.

2. The imaging optical system according to claim 1, wherein assuming that a lateral magnification of the second optical system is MAG2, Conditional Expression (1) is satisfied:

$$-0.4<MAG2<-0.1 \tag{1}.$$

3. The imaging optical system according to claim 2, wherein Conditional Expression (1-1) is satisfied:

$$-0.35<MAG2<-0.15 \tag{1-1}.$$

4. The imaging optical system according to claim 1, wherein assuming that a distance on an optical axis between the first positive lens and the cemented lens is Dab and a focal length of the first positive lens is fp1, Conditional Expression (2) is satisfied:

$$0.7<Dab/fp1<1.1 \tag{2}.$$

5. The imaging optical system according to claim 4, wherein Conditional Expression (2-1) is satisfied:

$$0.75<Dab/fp1<1.05 \tag{2-1}.$$

6. The imaging optical system according to claim 1, wherein assuming that a distance on an optical axis between the cemented lens and the second positive lens is Dcd and a focal length of the second positive lens is fp2, Conditional Expression (3) is satisfied:

$$0.65<Dcd/fp2<1.3 \tag{3}.$$

7. The imaging optical system according to claim 1, wherein assuming that a distance on an optical axis between the first positive lens and the cemented lens is Dab and a distance on the optical axis between the cemented lens and the second positive lens is Dcd, Conditional Expression (4) is satisfied:

$$0.2<Dcd/Dab<0.6 \tag{4}.$$

8. The imaging optical system according to claim 1, wherein assuming that a focal length of the first positive lens is fp1 and a focal length of the second positive lens is fp2, Conditional Expression (5) is satisfied:

$$0.15<fp2/fp1<0.5 \tag{5}.$$

9. The imaging optical system according to claim 1, wherein assuming that a lateral magnification of the second optical system is MAG2, a focal length of the first positive lens is fp1, and a focal length of the second positive lens is fp2, Conditional Expression (6) is satisfied:

$$-1.2<MAG2/(fp2/fp1)<-0.7 \tag{6}.$$

10. The imaging optical system according to claim 1, further comprising:
    a negative lens group that consists of a plurality of negative lenses and is disposed to be closest to the magnification side; and
    a positive lens that is disposed consecutively to the negative lens group on the reduction side of the negative lens group,
    wherein assuming that a Petzval sum of the negative lens group is Pzn, a focal length of the negative lens group is fn, and a maximum image height on the reduction side is Ymax, Conditional Expressions (7) and (8) are satisfied:

$$0.2<Pzn \times fn<0.8 \tag{7}$$

$$-0.8<Pzn \times Ymax<-0.3 \tag{8}.$$

11. The imaging optical system according to claim 1, wherein assuming that a Petzval sum of the first optical system is Pz1, a focal length of the first optical system is f1, and a maximum image height on the reduction side is Ymax, Conditional Expressions (9) and (10) are satisfied:

$$-0.6<Pz1 \times f1<-0.1 \tag{9}$$

$$-0.6<Pz1 \times Ymax<-0.1 \tag{10}.$$

12. The imaging optical system according to claim 1, wherein assuming that a Petzval sum of the second optical system is Pz2, a focal length of the second optical system is f2, and a maximum image height on the reduction side is Ymax, Conditional Expressions (11) and (12) are satisfied:

$$2.5 < Pz2 \times f2 < 6 \tag{11}$$

$$0.1 < Pz2 \times Y\text{max} < 0.6 \tag{12}$$

13. The imaging optical system according to claim 1, wherein assuming that a Petzval sum of the first optical system is Pz1 and a Petzval sum of the second optical system is Pz2, Conditional Expression (13) is satisfied:

$$-1.2 < Pz2/Pz1 < -0.7 \tag{13}$$

14. The imaging optical system according to claim 1, wherein the cemented lens consists of one negative lens and one positive lens, and
wherein assuming that an Abbe number of the negative lens within the cemented lens at a d line is $\nu n$ and an Abbe number of the positive lens within the cemented lens at the d line is $\nu p$, Conditional Expression (14) is satisfied:

$$-52 < \nu n - \nu p < -26 \tag{14}$$

15. The imaging optical system according to claim 1, wherein assuming that a focal length of the imaging optical system is f and a focal length of the second optical system is f2, Conditional Expression (15) is satisfied:

$$0.01 < |f|/f2 < 0.1 \tag{15}$$

16. The imaging optical system according to claim 1, wherein the number of lenses composing the first optical system is equal to or less than 10.

17. The imaging optical system according to claim 1, wherein the number of lenses composing the first optical system is 10.

18. The imaging optical system according to claim 1, wherein assuming that a focal length of the imaging optical system is f and a focal length of the first optical system is f1, Conditional Expression (16) is satisfied:

$$0.1 < |f|/f1 < 0.5 \tag{16}$$

19. A projection display device comprising:
a light source;
a light valve into which light emitted from the light source is incident; and
the imaging optical system according to claim 1,
wherein the imaging optical system projects an optical image formed by modulated light which is modulated by the light valve, onto a screen.

20. An imaging apparatus comprising the imaging optical system according to claim 1.

* * * * *